(12) United States Patent
Ryu et al.

(10) Patent No.: US 12,482,052 B2
(45) Date of Patent: Nov. 25, 2025

(54) THREE-DIMENSIONAL TOOTH IMAGE DISPLAY APPARATUS AND METHOD, AND METHOD FOR TRAINING THREE-DIMENSIONAL TOOTH IMAGE DISPLAY APPARATUS

(71) Applicant: OSSTEM IMPLANT CO., LTD., Seoul (KR)

(72) Inventors: Jegwang Ryu, Incheon (KR); Kyoo Ok Choi, Seoul (KR)

(73) Assignee: OSSTEM IMPLANT CO., LTD., Seoul (KR)

( * ) Notice: Subject to any disclaimer, the term of this patent is extended or adjusted under 35 U.S.C. 154(b) by 122 days.

(21) Appl. No.: 18/565,345

(22) PCT Filed: Jul. 25, 2022

(86) PCT No.: PCT/KR2022/010849
§ 371 (c)(1),
(2) Date: Nov. 29, 2023

(87) PCT Pub. No.: WO2023/008849
PCT Pub. Date: Feb. 2, 2023

(65) Prior Publication Data
US 2024/0257290 A1 Aug. 1, 2024

(30) Foreign Application Priority Data
Jul. 27, 2021 (KR) .................. 10-2021-0098582

(51) Int. Cl.
*G06T 1/00* (2006.01)
*G16H 30/20* (2018.01)

(52) U.S. Cl.
CPC .......... *G06T 1/0007* (2013.01); *G16H 30/20* (2018.01); *G06T 2207/20084* (2013.01); *G06T 2207/30036* (2013.01)

(58) Field of Classification Search
CPC .................................................... G06T 1/0007
(Continued)

(56) References Cited

U.S. PATENT DOCUMENTS 12,232,923 B2 * 2/2025 Anssari Moin ........ A61C 7/002
2012/0258416 A1 * 10/2012 Tong ....................... A61C 19/04
433/24
(Continued)

FOREIGN PATENT DOCUMENTS

EP 3 462 373 A1 4/2019
JP 2020-516335 A 6/2020
(Continued)

OTHER PUBLICATIONS

Heo et al. "3D Reconstruction System of Teeth for Dental Simulation" *The KIPS Transactions: PartB* vol. 11 No. 2, 2004 (8 Pages Korean).
(Continued)

*Primary Examiner* — Reza Nabi
(74) *Attorney, Agent, or Firm* — NSIP Law (57) ABSTRACT

A three-dimensional tooth image display apparatus, according to an embodiment of the present invention, comprises: a tooth division unit which divides a boundary of each object in a dental cross-section image generated by dividing an input three-dimensional dental image in an axial direction; a tooth detection unit which recognizes a tooth area among objects in the dental cross-sectional image and detects a tooth number of each tooth belonging to the tooth area; and a tooth image obtainment unit which generates a three-dimensional image of each tooth on the basis of the boundary of each object in each dental cross-sectional image and the tooth number of each tooth, which are obtained through the tooth division unit and the tooth detection unit, wherein
(Continued)

the three-dimensional image of each tooth may have a different display method according to the tooth number.

11 Claims, 7 Drawing Sheets

(58) Field of Classification Search
USPC .......................................................... 715/700
See application file for complete search history.

(56) References Cited

U.S. PATENT DOCUMENTS

| | | | | |
|---|---|---|---|---|
| 2019/0026599 | A1* | 1/2019 | Salah | G06F 18/22 |
| 2020/0015943 | A1* | 1/2020 | Reynard | G16H 40/63 |
| 2020/0320685 | A1* | 10/2020 | Anssari Moin | G06N 3/08 |
| 2021/0073977 | A1* | 3/2021 | Carter | G06T 11/20 |
| 2021/0073998 | A1* | 3/2021 | Brown | G06N 3/045 |
| 2021/0074425 | A1* | 3/2021 | Carter | G06N 20/00 |
| 2021/0082184 | A1* | 3/2021 | Claessen | G06T 17/20 |
| 2021/0150702 | A1* | 5/2021 | Claessen | G06T 17/10 |
| 2023/0218370 | A1* | 7/2023 | Azernikov | A61C 9/004 |
| | | | | 345/423 |
| 2023/0248243 | A1* | 8/2023 | Moheb | A61B 5/7264 |
| | | | | 433/29 |
| 2023/0248475 | A1* | 8/2023 | Bergeyron | A61C 13/0004 |
| | | | | 382/128 |
| 2023/0260238 | A1* | 8/2023 | Burgos Artizzu | G06T 19/20 |
| | | | | 345/419 |
| 2024/0164874 | A1* | 5/2024 | Lipnik | G16H 30/40 |
| 2024/0257290 | A1* | 8/2024 | Ryu | G06N 3/02 |
| 2025/0005772 | A1* | 1/2025 | Ro | G06T 17/00 |

FOREIGN PATENT DOCUMENTS

| | | |
|---|---|---|
| KR | 10-1739091 B1 | 5/2017 |
| KR | 10-2017-0098386 A | 8/2017 |
| KR | 10-1839789 B1 | 3/2018 |
| KR | 10-1903424 B1 | 11/2018 |
| KR | 10-2020-0129509 A | 11/2020 |
| KR | 10-2021-0006244 A | 1/2021 |

OTHER PUBLICATIONS

Office action issued Apr. 19, 2023 in counterpart Korean Patent application No. 10-2021-0098528 (3 pages Korean).

Office action issued Oct. 4, 2023 in counterpart Korean Patent application No. 10-2021-0098528 (2 pages Korean).

Miki, Yuma, et al., "Classification of teeth in cone-beam CT using deep convolutional neural network", Computers in Biology and Medicine, 2017, (6 Pages in English).

Miki, Yuma, et al., "Tooth labeling in cone-beam CT using deep convolutional neural network for forensic identification", Medical Imaging 2017: Computer-Aided Diagnosis, vol. 10134, SPIE, 2017, (6 Pages in English).

Extended European Search Report Issued on Jul. 22, 2025, in Counterpart European Patent Application No. 22849825.9 (8 Pages in English).

* cited by examiner

THREE-DIMENSIONAL TOOTH IMAGE DISPLAY APPARATUS AND METHOD, AND METHOD FOR TRAINING THREE-DIMENSIONAL TOOTH IMAGE DISPLAY APPARATUS

CROSS REFERENCE TO RELATED APPLICATIONS

This application is a U.S. National Stage Application of International Application No. PCT/KR2022/010849, filed on Jul. 25, 2022, which claims the benefit under 35 USC 119(a) and 365(b) of Korean Patent Application No. 10-2021-0098582, filed on Jul. 27, 2021, in the Korean Intellectual Property Office, the entire disclosure of which is incorporated herein by reference for all purposes.

TECHNICAL FIELD

The present invention relates to a three-dimensional tooth image display apparatus and method, and a method for training a three-dimensional tooth image display apparatus, and more specifically, to a three-dimensional tooth image display apparatus and method, which uses an artificial neural network to display a three-dimensional dental image from a dental cross-sectional image of an oral area and to detect a tooth number, and a method for training a three-dimensional tooth image display apparatus.

BACKGROUND ART

Generally, during implant procedures, a tooth number, which is the tooth placement number for a subject, is required.

Accordingly, traditionally, a dental practitioner manually confirms the tooth number using two-dimensional low-dose cone-beam computed tomography (CBCT) images.

However, conventional CBCT images have difficulties in confirming the oral status of a patient due to the abundant occurrence of metal artifacts distorted by a crown of a tooth.

To address this issue, recently, a method of providing tooth images using a pre-trained artificial neural network model based on CBCT images is being used.

DISCLOSURE

Technical Problem

An object of the present invention for solving the above problems is to provide a three-dimensional tooth image display apparatus and method for displaying a three-dimensional tooth image accurately distinguished by a tooth number while reducing data processing throughput and loading time, and a method for training the same efficiently and rapidly.

Technical Solution

According to one embodiment of the present invention for achieving the above object, a three-dimensional tooth image display apparatus includes a tooth division unit which divides a boundary of each object in a dental cross-section image generated by dividing an input three-dimensional dental image in an axial direction, a tooth detection unit which recognizes a tooth area among objects in the dental cross-sectional image and detects a tooth number of each tooth belonging to the tooth area, and a tooth image obtainment unit which generates a three-dimensional image of each tooth on the basis of the boundary of each object in each dental cross-sectional image and the tooth number of each tooth, which are obtained through the tooth division unit and the tooth detection unit, wherein the three-dimensional image of each tooth may have a different display method according to the tooth number.

The tooth division unit may include a tooth division neural network, and the tooth division neural network may be trained using a plurality of training dental cross-sectional images as training input data and as well as using, as label data, a masking image in which a boundary region of each object in the training dental cross-sectional images is masked.

The tooth detection unit may include a tooth detection neural network, and the tooth detection neural network may be trained using a plurality of training dental cross-sectional images as training input data and as well as using, as label data, a tooth area where a tooth exists in the training dental cross-sectional images and a tooth number for each tooth within the tooth area.

The tooth image obtainment unit may include a tooth image obtainment neural network, and the tooth image obtainment neural network may be trained to generate individual three-dimensional images for each tooth with the same tooth number within the three-dimensional image on the basis of training dental cross-sectional images generated by dividing a three-dimensional image along one axis and boundary information of each tooth and a tooth number of each tooth within each training dental cross-sectional image.

The tooth image obtainment neural network may be trained to generate the individual three-dimensional images by stacking tooth-specific divided images extracted based on the boundary information within each of the divided training dental cross-sectional images and tooth-specific divided images with the same tooth number for the extracted tooth-specific divided images in the axial direction.

The display method may include displaying at least some teeth in different colors according to a tooth number of each tooth.

The display method may include displaying teeth in a same color when a relationship of tooth numbers for each tooth is a mirroring or antagonist relationship, or displaying teeth in different colors when a relationship of tooth numbers for each tooth is not a mirroring or antagonist relationship.

The three-dimensional dental image may include a cone-beam computed tomography (CBCT), and the divided dental cross-sectional image may be an image perpendicular to the axial direction.

According to another embodiment of the present invention for achieving the object, a three-dimensional tooth image display method includes dividing a boundary of each object in a dental cross-section image generated by dividing an input three-dimensional dental image in an axial direction, recognizing a tooth area among objects in the dental cross-sectional image and detecting a tooth number of each tooth belonging to the tooth area, and generating a three-dimensional image of each tooth on the basis of the obtained boundary of each object in each dental cross-sectional image and the obtained tooth number of each tooth, wherein the three-dimensional image of each tooth may have a different display method according to the tooth number.

According to yet another embodiment of the present invention for achieving the above object, a method for training a three-dimensional tooth image division device includes training a tooth division neural network to divide a boundary of each object in a dental cross-section image generated by dividing an input three-dimensional dental image in an axial direction, training a tooth detection neural network to recognize a tooth area among objects in the dental cross-sectional image and detect a tooth number of each tooth belonging to the tooth area, and training a tooth image obtainment neural network to generate a three-dimensional image of each tooth on the basis of the boundary of each object in each dental cross-sectional image and the tooth number of each tooth, which are obtained through the tooth division neural network and the tooth detection neural network.

The training dental cross-sectional image may be generated by dividing a training three-dimensional image along one axis, and the training of the tooth image obtainment neural network may further include training the tooth image obtainment neural network to generate individual three-dimensional images for each tooth with the same tooth number within the three-dimensional image on the basis of boundary information of each tooth and a tooth number of each tooth within each training dental cross-sectional image.

Advantageous Effects

According to an embodiment of the present invention, a three-dimensional tooth image display apparatus and display method, as well as a method for training a three-dimensional tooth image display apparatus, train an artificial neural network model to recognize at least one tooth number from axial dental cross-sectional images.

The apparatus and method according to an embodiment of the present invention provide three-dimensional images divided tooth by tooth, thereby preventing the data overhead issue that occurs when training data and recognizing and displaying tooth and tooth number within a tooth image of an arbitrary patient, when compared to conventional tooth detection methods trained to detect and segment teeth into a plurality of three-dimensional cells using 3D CBCT images.

Furthermore, it is possible to provide a three-dimensional tooth image display apparatus and display method for displaying a three-dimensional dental image accurately distinguished by a tooth number while reducing data processing throughput and loading time, as well as a method for training the same efficiently and rapidly.

MODE OF THE INVENTION

While the present invention is susceptible to various modifications and alternative forms, specific embodiments are shown by way of example in the drawings and described in detail. It should be understood, however, that the description is not intended to limit the present invention to the specific embodiments, but, on the contrary, the present invention is to cover all modifications, equivalents, and alternatives that fall within the spirit and scope of the present invention.

Although the terms "first," "second," "A," "B," etc. may be used herein in reference to various elements, such elements should not be construed as limited by these terms. These terms are only used to distinguish one element from another.

For example, a first element could be termed a second element, and a second element could be termed a first element, without departing from the scope of the present invention. The term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directed coupled" to another element, there are no intervening elements.

The terminology used herein is for the purpose of describing particular embodiments only and is not intended to be limiting of embodiments of the present invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, parts, and/or combinations thereof, but do not preclude the presence or addition of one or more other features, integers, steps, operations, elements, parts, and/or combinations thereof.

Unless otherwise defined, all terms (including technical and scientific terms) used herein have the same meaning as commonly understood by those of ordinary skill in the art to which the present invention pertains. It will be further understood that terms defined in commonly used dictionaries should be interpreted as having a meaning that is consistent with their meaning in the context of the related art and will not be interpreted in an idealized or overly formal sense unless expressly so defined herein.

Hereinafter, exemplary embodiments of the present invention will be described in greater detail with reference to the accompanying drawings. In order to facilitate a thorough understanding of the present invention, the same reference numerals designate the same components in the drawings, and repeated description of the same components will be omitted.

Figure 1:
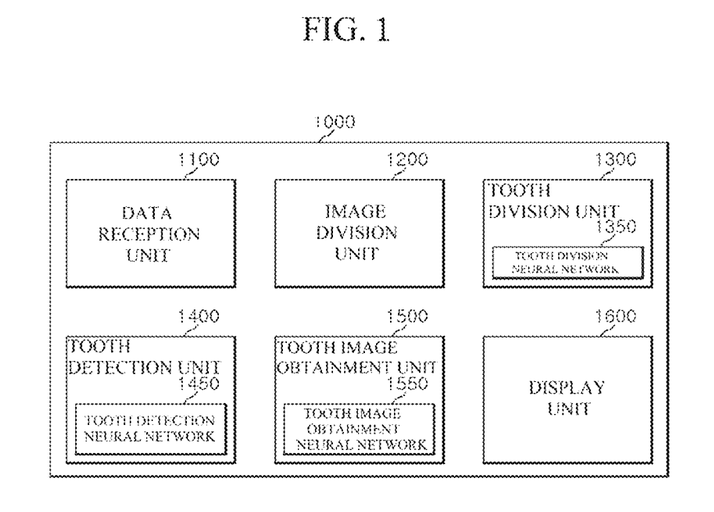
FIG. 1 is a block diagram illustrating a three-dimensional tooth image display apparatus according to an embodiment of the present invention.

FIG. 1 is a block diagram illustrating a three-dimensional tooth image display apparatus according to an embodiment of the present invention.

Referring to FIG. 1, a three-dimensional tooth image display apparatus 1000 may include a data reception unit 1100, an image division unit 1200, a tooth division unit 1300, a tooth detection unit 1400, a tooth image obtainment unit 1500, and a display unit 1600.

The three-dimensional tooth image display apparatus 1000 may detect a boundary of an object included in each of a plurality of dental cross-sectional images using a pre-trained tooth division neural network model.

Additionally, the three-dimensional tooth image display apparatus 1000 may detect the width and number of at least one tooth in a dental cross-sectional image using a tooth detection neural network model.

In addition, the three-dimensional tooth image display apparatus 1000 may output at least one detected tooth as a three-dimensional image. Accordingly, the three-dimensional tooth image display apparatus 1000 may provide tooth placement information necessary during implant procedures.

The data reception unit 1100 may receive at least one three-dimensional dental image where at least a portion of an oral area is captured from an external source.

For example, the data reception unit 1100 may receive at least one three-dimensional dental image from an external imaging device. The three-dimensional dental image input from the external imaging device may include a three-dimensional cone-beam computed tomography (CBCT) dental image.

The image division unit 1200 may divide the received three-dimensional dental image from the data reception unit 1100 into a plurality of dental cross-sectional images perpendicular to the axial direction, generating a plurality of dental cross-sectional images.

For example, if the three-dimensional dental image is a three-dimensional CBCT dental image, the image division unit 1200 may slice the three-dimensional CBCT dental image perpendicular to the axial direction to generate a plurality of dental cross-sectional images.

According to the embodiment, the dental cross-sectional images may be axial cross-sectional images perpendicular to the axial direction in the CBCT images containing grayscale information within the range of 0 to 255.

The tooth division unit 1300 may include a tooth division neural network 1350. Additionally, the tooth division unit 1300 may receive at least one dental cross-sectional image from the image division unit 1200 and output a first image in which at least one object included in the received dental cross-sectional image is masked.

In more detail, the tooth division unit 1300 may input at least one dental cross-sectional image received from the image division unit 1200 into the tooth division neural network 1350. Additionally, the tooth division unit 1300 may use the tooth division neural network 1350 to detect a boundary of at least one object included in the dental cross-sectional image.

Next, the tooth division unit 1300 may generate an individually masked first image with the boundary of at least one object marked. For example, the object for which the tooth division unit 1300 detects a boundary using the tooth division neural network 1350 may include at least one tooth.

In addition, the tooth division neural network 1350 may be a machine-trained model utilizing, as label data, at least one training dental cross-sectional image containing at least one tooth and a masking image mapped to CT coordinates of the tooth in the training dental cross-sectional image. For example, the tooth division neural network 1350 may include a convolutional neural network.

Therefore, the tooth division unit 1300 may utilize the tooth division neural network 1350 on any input dental cross-sectional image to identify the boundaries of teeth within the dental cross-sectional image and acquire the first image with the tooth boundary marked.

Figure 2:
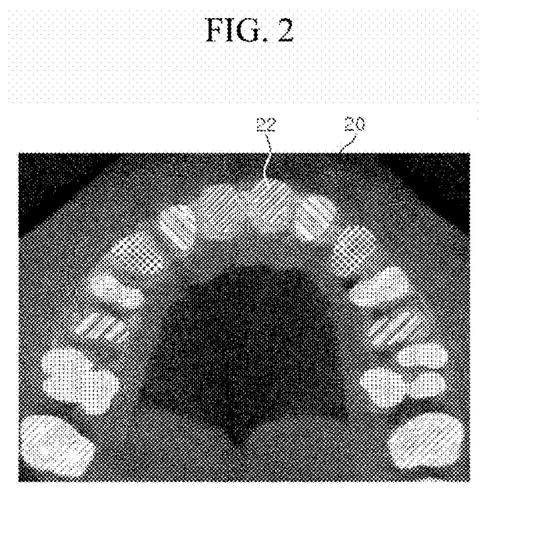
FIG. 2 is an output result image of the tooth division unit of the three-dimensional tooth image display apparatus according to an embodiment of the present invention.

FIG. 2 is an output result image of the tooth division unit of the three-dimensional tooth image display apparatus according to an embodiment of the present invention.

The tooth division unit 1300 may receive at least one dental cross-sectional image 20 from the image division unit 1200. Subsequently, the tooth division unit 1300 may use the tooth division neural network 1350 to obtain a masked dental image by dividing a boundary of at least one tooth within the received dental cross-sectional image 20.

As shown in FIG. 1, the tooth detection unit 1400 may include a tooth detection neural network 1450. The tooth detection unit 1400 may generate tooth-specific attribute information from at least one dental cross-sectional image received from the image division unit 1200.

Specifically, the tooth detection unit 1400 may input at least one dental cross-sectional image received from the image division unit 1200 into the tooth detection neural network 1450. Next, the tooth detection unit 1400 may use the tooth detection neural network 1450 to obtain a second image displaying the tooth-specific attribute information, including at least one of tooth width or tooth number, from at least one tooth contained in the dental cross-sectional image. For example, tooth-specific attribute information for tooth number 22 may include either the width of tooth number 22, the tooth number of tooth number 22, or both.

According to one embodiment, the tooth detection neural network 1450 may be trained using a convolutional neural network.

Specifically, the tooth detection neural network 1450 may be machine-trained using, as label data, at least one dental cross-sectional image including at least one tooth and the tooth number and position that are mapped to CT coordinates of the tooth in the dental cross-sectional image.

Therefore, the tooth detection unit 1400 may input the dental cross-sectional image into the tooth detection neural network 1450 to obtain the second image displaying the tooth-specific attribute information, including the tooth number, indicated.

Figure 3:
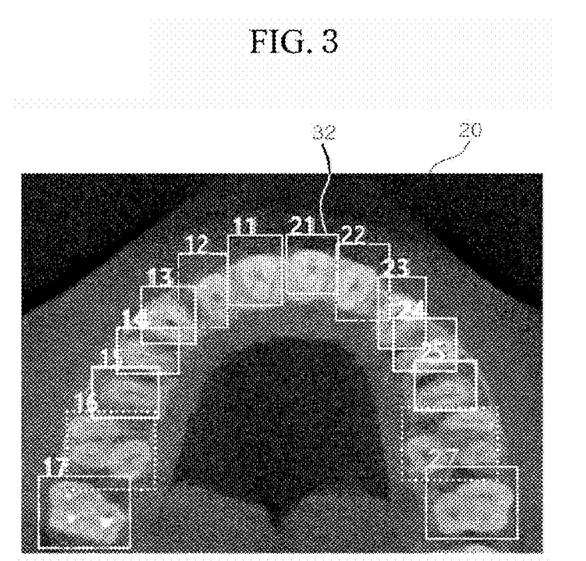
FIG. 3 is an output result image of a tooth detection unit of the three-dimensional tooth image display apparatus according to an embodiment of the present invention.

FIG. 3 is an output result image of a tooth detection unit of the three-dimensional tooth image display apparatus according to an embodiment of the present invention.

As shown in FIGS. 1 and 3, the tooth detection unit 1400 may detect and obtain detection information included in the second image on the dental cross-sectional image 20 received from the data reception unit 1100 for each tooth in a predetermined form. For example, the tooth detection unit 1400 may detect the detection information in the form of a box 32.

In addition, the tooth detection unit 1400 may obtain at least one attribute information for each tooth from coordinate data obtained using the tooth detection neural network 1450. In this case, the attribute information may include at least one of tooth position information or tooth width information of each tooth.

Also, as shown in FIG. 1, the tooth image obtainment unit 1500 may obtain a plurality of two-dimensional divided images of each tooth by dividing at least one first image and one second image obtained from the tooth division unit 1300 and the tooth detection unit 1400, respectively.

Subsequently, the tooth image obtainment unit 1500, based on at least one piece of information obtained from the tooth division unit 1300 and the tooth detection unit 1400, may classify the plurality of two-dimensional divided images into the same tooth categories. According to one embodiment, the at least one piece of information may include at least one of tooth number, tooth coordinate data, or tooth boundary information.

The tooth image obtainment unit 1500 may include a tooth image obtainment neural network 1550. Moreover, the tooth image obtainment unit 1500 may obtain a third image by reconstructing at least one three-dimensional image from at least one two-dimensional divided image for at least one first image and one second image that are classified into the same tooth category.

For example, the tooth image obtainment unit 1500 may stack the two-dimensional divided images classified into the same tooth category in the axial direction to obtain a third image, which is a three-dimensional reconstructed individual tooth image.

To be more specific, the tooth image obtainment neural network 1550 may be trained in advance to generate individual three-dimensional images for each tooth with the same tooth number within the three-dimensional image on the basis of training dental cross-sectional images generated by dividing a three-dimensional image along one axis, and boundary information and a tooth number of each tooth within each training dental cross-sectional image.

The tooth image obtainment neural network 1550 may stack the tooth-specific divided images extracted based on the boundary information within each of the divided training dental cross-sectional images, and tooth-specific divided images with the same tooth number for the extracted tooth-specific divided images in the axial direction to generate individual three-dimensional images for each tooth.

Additionally, the tooth image obtainment neural network 1550 may be trained to generate individual three-dimensional images for each tooth with the same tooth number within the three-dimensional image using the stacked images.

The tooth image obtainment unit 1500 may consider the tooth numbers or types of teeth present in the three-dimensional dental image and mask at least some teeth with different colors based on the tooth numbers or types of the teeth.

For example, the tooth image obtainment unit 1500 may use the same color for masking when the relationship of tooth numbers for each tooth is a mirroring or antagonist relationship. Additionally, when the relationship of tooth numbers for each tooth is not a mirroring or antagonist relationship, the tooth image obtainment unit 1500 may use different colors for masking.

The tooth image obtainment neural network 1550 may be trained to generate a three-dimensional image for each tooth with the same tooth number in the three-dimensional image by stacking CBCT crop DICOM images for each tooth within the dental sectional image in one axial direction.

The three-dimensional tooth image display apparatus 1000 according to one embodiment of the present invention may obtain a three-dimensional image of each tooth based on two-dimensional images, the first image and the second image, thereby reducing data processing throughput and loading time and providing a three-dimensional dental image accurately distinguished by a tooth number.

Figure 4:
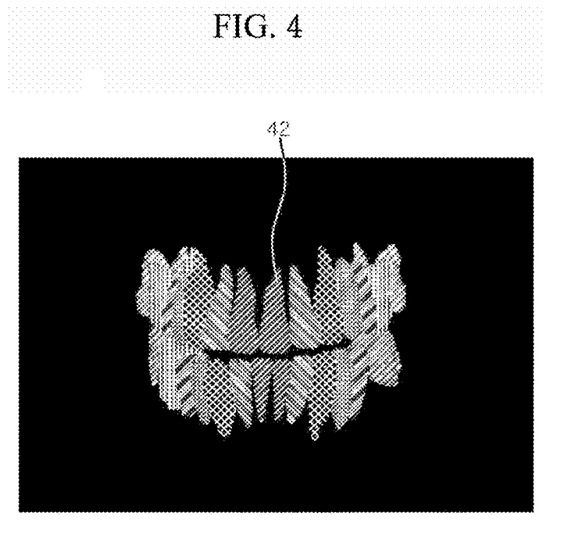
FIG. 4 is an output result image of an image division unit of the three-dimensional tooth image display apparatus according to an embodiment of the present invention.

FIG. 4 is an output result image of an image division unit of the three-dimensional tooth image display apparatus according to an embodiment of the present invention.

As shown in FIGS. 1 and 4, the tooth image obtainment unit 1500 may receive the first and second images from the tooth division unit 1300 and the tooth detection unit 1400, respectively, to generate a three-dimensional image 42 of each tooth. Additionally, the tooth image obtainment unit 1500 may use the tooth image obtainment neural network 1550 to generate a three-dimensional dental image with masked coordinates corresponding to the mapped three-dimensional images of each tooth.

The tooth image obtainment unit 1500 may generate a 3D dental image in which a display method for the three-dimensional image 42 for each image varies according to the tooth number. Furthermore, the display unit 1600 may output the three-dimensional image 42 of each tooth 42 with a different color according to the tooth number of each tooth.

For example, the tooth image obtainment unit 1500 may set the three-dimensional images 42 for teeth 11, 21, 31, and 41, which belong to the same tooth category, to be displayed in red. Also, the display unit 1600 may display the three-dimensional images 42 for these teeth in red.

Figure 5:
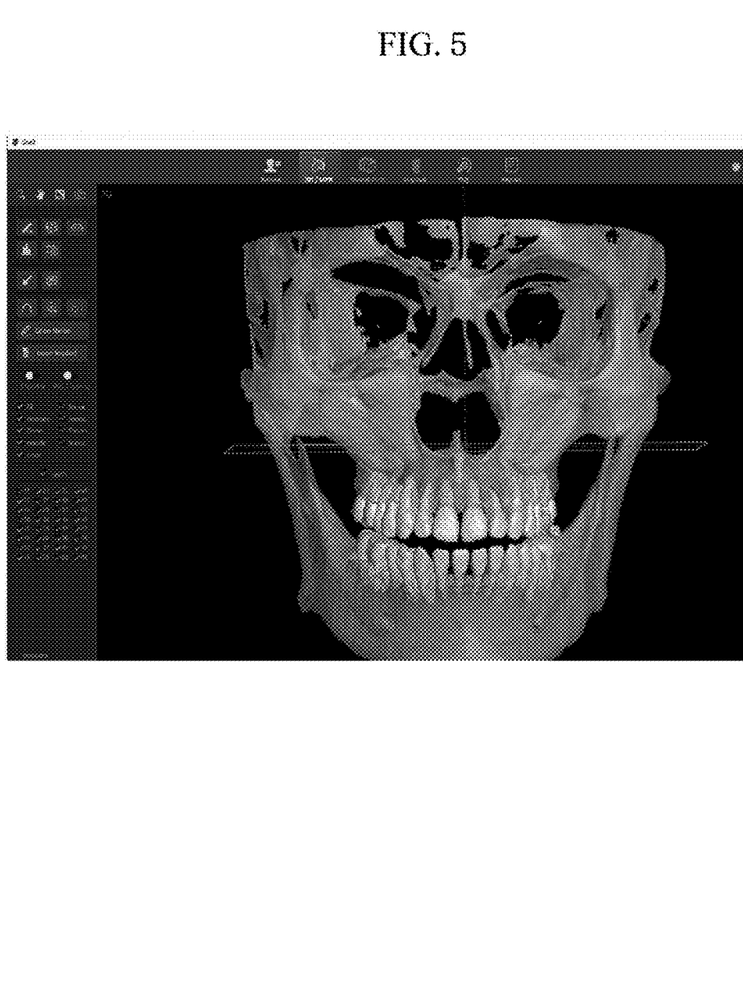
FIG. 5 is a final output result image of the three-dimensional tooth image display apparatus according to an embodiment of the present invention.

FIG. 5 is a final output result image of the three-dimensional tooth image display apparatus according to an embodiment of the present invention.

As shown in FIGS. 1 and 5, the three-dimensional tooth image display apparatus 1000 may output a three-dimensional tooth area in which individual teeth are separated and displayed as the final output result image. The three-dimensional tooth image display apparatus 1000 may distinguish and display the area where teeth are represented from other areas.

The software configurations of the three-dimensional tooth image display apparatus according to one embodiment of the present invention have been described above.

In the following description, the hardware configurations for the three-dimensional tooth image display apparatus according to one embodiment of the present invention will be described in more detail with reference to FIG. 6.

Figure 6:
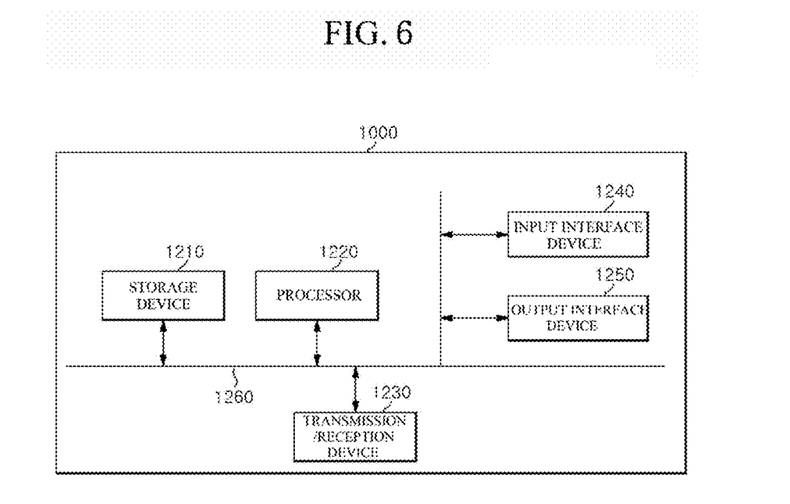
FIG. 6 is a block diagram for describing the three-dimensional tooth image display apparatus according to an embodiment of the present invention in terms of hardware.

FIG. 6 is a block diagram for describing hardware configurations of the three-dimensional tooth image display apparatus according to an embodiment of the present invention.

As shown in FIGS. 1 and 6, the three-dimensional tooth image display apparatus 1000 may include a storage device 1210 configured to store at least one instruction, a processor 1220 configured to execute the at least one instruction of the storage device, a transmission/reception device 1230, an input interface device 1240, and an output interface device 1250.

Each of the components 1210, 1220, 1230, 1240, and 1250 included in the three-dimensional tooth image display apparatus 1000 may be connected via a data bus 1260 to each other and communicate with each other.

The storage device 1210 may include at least one of a memory, a volatile storage medium, or a non-volatile storage medium. For example, the storage device 1210 may include at least one of read-only memory (ROM) or random access memory (RAM).

The storage device 1210 may further include at least one instruction to be executed by the processor 1220, which will be described below.

According to another embodiment of the present invention, at least one instruction may include a first instruction to train the tooth division neural network 1350 to divide the boundary of each object within a dental cross-sectional image divided in an axial direction, and a second instruction to train the tooth detection neural network 1450 to detect a tooth area and a tooth number of each tooth within the training dental cross-sectional image. Additionally, the at least one instruction may include a third instruction to train the tooth image obtainment neural network 1550 to extract divided images for each tooth with the same tooth number from a plurality of images individually obtained by the first instruction and the second instruction, stack the plurality of divided images for each tooth in the axial direction, and output a plurality of tooth-specific three-dimensional divided images reconstructed as three-dimensional images containing the tooth number and the tooth position.

The processor 1220 may be a central processing unit (CPU), a graphics processing unit (GPU), or a specific processor configured to execute methods according to the present invention.

Referring further to FIG. 1, the processor 1220, as described above, may perform the functions of the image division unit 1200, the tooth division unit 1300, the tooth detection unit 1400, and the tooth image obtainment unit 1500 according to at least one program instruction stored in the storage device 1210.

The input interface device 1240 may receive at least one control signal from a user, and the output interface device 1250 may output and visualize at least one piece of information related to the three-dimensional tooth image generated by the processor 1220.

The three-dimensional tooth image display apparatus is described above according to one embodiment of the present invention. In the following description, a method for training a three-dimensional tooth image executed by the processor within the three-dimensional tooth image display device will be described according to another embodiment of the present invention.

Figure 7:
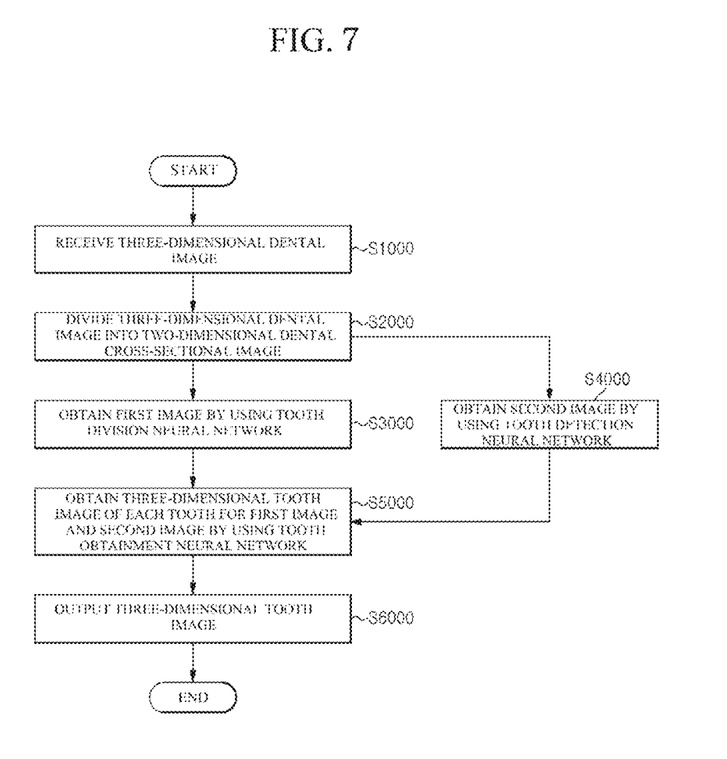
FIG. 7 is a flowchart illustrating a method for training a three-dimensional tooth image according to another embodiment of the present invention.

FIG. 7 is a flowchart illustrating a method for training a three-dimensional tooth image according to another embodiment of the present invention.

As shown in FIGS. 1, 6, and 7, the transmission/reception device 1230 in the three-dimensional tooth image display apparatus 1000 may receive at least one three-dimensional dental image of teeth captured from outside (S1000).

Next, the processor 1220 may divide the three-dimensional dental image in an axial direction to obtain a dental cross-sectional image (S2000). For example, the three-dimensional dental image may be a three-dimensional CBCT image. In addition, the dental cross-sectional image may be a cross-sectional image obtained by slicing the CBCT image in the axial direction.

Subsequently, the processor 1220 may detect at least one tooth boundary from at least one dental cross-sectional image using a pre-trained tooth division neural network 1350.

Moreover, the processor 1220 may obtain a first image by dividing the boundary of each tooth from at least one dental cross-sectional image using the tooth division segmentation neural network 1350 (S3000). In this case, the tooth division neural network 1350 may be trained using a plurality of training dental cross-sectional images as training input data and as well as using, as label data, a masking ground truth image in which the ground truth boundary region of each object in the training dental cross-sectional images is masked. Additionally, the tooth division neural network 1350 may be trained using a convolutional neural network.

The processor 1220 may obtain a second image including tooth detection information from at least one dental cross-sectional image using the pre-trained tooth detection neural network 1450 (S4000).

Here, the tooth detection neural network 1450 may be trained using a plurality of training dental cross-sectional images as training input data and using, as label data, the tooth area where a tooth exists in the training dental cross-sectional images and the tooth number for each tooth within the tooth area. In addition, the tooth detection neural network 1450 can be trained using a convolutional neural network.

Subsequently, the processor 1220 may output coordinate data for the plurality of dental cross-sectional images and use the tooth detection neural network 1450 to obtain a second image containing attribute information of each tooth within the dental cross-sectional images. The attribute information may include at least one of the tooth width or the tooth number of each tooth.

Thereafter, the processor 1220 may obtain a three-dimensional third image including a region of interest from at least one of the first image or the second image.

In other words, the processor 1220 may divide the first and second images tooth by tooth, classify the divided images for the same tooth using the pre-trained tooth image obtainment neural network 1550, and stack them in the axial direction. Therefore, the processor 1220 may obtain a three-dimensional tooth image reconstructed in three-dimensions (S5000).

Afterwards, the processor 1220 may output the three-dimensional image of the tooth through the output interface device 1250 (S5000).

A three-dimensional image display apparatus and method according to yet another embodiment of the present invention, as well as a method of providing a three-dimensional tooth image using the same, include a first step of training the tooth division neural network 1350 to divide a boundary of each object within a dental cross-sectional image divided in the axial direction and a second step of training a tooth detection neural network 1450 to detect a tooth area and a tooth number of each tooth within the training dental cross-sectional image. Subsequently, the apparatus and method according to an embodiment of the present invention include a third step of training the tooth image obtainment neural network 1550 to extract divided images for each tooth with the same tooth number from a plurality of images individually obtained from the first step and the second step, stack the plurality of divided images for each tooth in the axial direction, and output a plurality of tooth-specific three-dimensional divided images reconstructed as three-dimensional images containing the tooth number and the tooth position of the tooth.

Thus, the apparatus and method according to an embodiment of the present invention may prevent the data overhead issue that occurs when training and utilizing data, when compared to conventional tooth detection methods trained to detect and segment teeth into a plurality of three-dimensional cells using 3D CBCT images. Furthermore, the apparatus and method according to an embodiment of the present invention may provide a three-dimensional tooth image display apparatus and method with an improved processing speed and loading time for three-dimensional tooth reconstruction, as well as a method for displaying a three-dimensional tooth image using the same.

Therefore, the method for training a three-dimensional tooth image according to another embodiment of the present invention may reduce the duration of implant surgery, eliminate noise caused by crown deformations of teeth, and potentially be utilized for three-dimensional sectional images centered on teeth.

Combinations of blocks in the accompanying block diagrams or steps in the accompanying flowcharts can be executed by computer programs or instruction code. These computer programs or code may create means for implementing the functions specified in each block of the block diagrams and/or the flowcharts. These computer programs or code may be stored on any type of computer-usable or readable recording medium. Thus, the programs or code stored in the recording medium can also produce items that perform the functions of each block or each step in the flowcharts. In addition, these programs or code may be loaded onto a computer or other programmable data processing device, allowing the computer or other programmable data processing device to perform a series of operational steps.

Each of the blocks or steps may indicate a part of a module including one or more executable programs or code, or a part of code, and the functions described in the blocks or steps can be performed out of sequence. For example, two blocks or steps shown in succession may in fact be executed at the same time, and the two blocks or steps may also be executed in the reverse order of the corresponding function.

While the present invention includes example embodiments, it will be apparent to one of ordinary skill in the art that various changes in form and details may be made in these example embodiments without departing from the spirit and scope of the claims and their equivalents.

The invention claimed is:

1. A three-dimensional tooth image display apparatus comprising:
   a tooth division unit which divides a boundary of each object in a dental cross-section image generated by dividing an input three-dimensional dental image in an axial direction;
   a tooth detection unit which recognizes a tooth area among objects in the dental cross-sectional image and detects a tooth number of each tooth belonging to the tooth areal; and
   a tooth image obtainment unit which generates a three-dimensional image of each tooth on the basis of the boundary of each object in each dental cross-sectional image and the tooth number of each tooth, which are obtained through the tooth division unit and the tooth detection unit, wherein the three-dimensional image of each tooth has a different display method according to the tooth number, wherein the display method comprises displaying at least some teeth in different colors according to a tooth number of each tooth.

2. The three-dimensional tooth image display apparatus of claim 1, wherein the tooth division unit comprises a tooth division neural network, and the tooth division neural network is trained using a plurality of training dental cross-sectional images as training input data and as well as using, as label data, a masking image in which a boundary region of each object in the training dental cross-sectional images is masked.

3. The three-dimensional tooth image display apparatus of claim 1, wherein the tooth detection unit comprises a tooth detection neural network, and the tooth detection neural network is trained using a plurality of training dental cross-sectional images as training input data and as well as using, as label data, a tooth area where a tooth exists in the training dental cross-sectional images and a tooth number for each tooth within the tooth area.

4. The three-dimensional tooth image display apparatus of claim 1, wherein the tooth image obtainment unit comprises a tooth image obtainment neural network, and the tooth image obtainment neural network is trained to generate individual three-dimensional images for each tooth with the same tooth number within the three-dimensional image on the basis of training dental cross-sectional images generated by dividing a three-dimensional image along one axis and boundary information of each tooth and a tooth number of each tooth within each training dental cross-sectional image.

5. The three-dimensional tooth image display apparatus of claim 4, wherein the tooth image obtainment neural network is trained to generate the individual three-dimensional images by stacking tooth-specific divided images extracted based on the boundary information within each of the divided training dental cross-sectional images and tooth-specific divided images with the same tooth number for the extracted tooth-specific divided images in the axial direction.

6. The three-dimensional tooth image display apparatus of claim 1, wherein the display method comprises displaying teeth in a same color when a relationship of tooth numbers for each tooth is a mirroring or antagonist relationship, or displaying teeth in different colors when a relationship of tooth numbers for each tooth is not a mirroring or antagonist relationship.

7. The three-dimensional tooth image display apparatus of claim 1, wherein the three-dimensional dental image comprises a cone-beam computed tomography (CBCT), and the divided dental cross-sectional image is an image perpendicular to the axial direction.

8. A three-dimensional tooth image display method comprising:
   dividing a boundary of each object in a dental cross-section image generated by dividing an input three-dimensional dental image in an axial direction;
   recognizing a tooth area among objects in the dental cross-sectional image and detecting a tooth number of each tooth belonging to the tooth area; and
   generating a three-dimensional image of each tooth on the basis of the obtained boundary of each object in each dental cross-sectional image and the obtained tooth number of each tooth, wherein the three-dimensional image of each tooth has a different display method according to the tooth number, wherein the display method comprises displaying at least some teeth in different colors according to a tooth number of each tooth.

9. A method for training a three-dimensional tooth image display apparatus, comprising: training a tooth division neural network to divide a boundary of each object in a dental cross-section image generated by dividing an input three-dimensional dental image in an axial direction;
   training a tooth detection neural network to recognize a tooth area among objects in the dental cross-sectional image and detect a tooth number of each tooth belonging to the tooth area; and training a tooth image obtainment neural network to generate a three-dimensional image of each tooth on the basis of the boundary of each object in each dental cross-sectional image and the tooth number of each tooth, which are obtained through the tooth division neural network and the tooth detection neural network,
   wherein the three-dimensional image of each tooth has a different display method according to the tooth number, wherein the display method comprises displaying at least some teeth in different colors according to a tooth number of each tooth.

10. The method of claim 9, wherein the training dental cross-sectional image is an image generated by dividing a training three-dimensional image along one axis.

11. The method of claim 9, wherein the training of the tooth image obtainment neural network comprises training the tooth image obtainment neural network to generate individual three-dimensional images for each tooth with the same tooth number within the three-dimensional image on the basis of boundary information of each tooth and a tooth number of each tooth within each training dental cross-sectional image.

\* \* \* \* \*